United States Patent Office 2,844,543
Patented July 22, 1958

2,844,543

TRANSPARENT PHOTOCONDUCTIVE COMPOSITION

Richard A. Fotland, Cleveland, Ohio, assignor to Horizons Incorporated

No Drawing. Application March 18, 1955
Serial No. 495,327

3 Claims. (Cl. 252—501)

This invention relates to a novel photoconductive material. More particularly, it relates to an improved photoconductive material comprising combinations of arsenic, sulfur and selenium.

Recent activity in the field of photoconductive television pickup tubes, electrostatic photography and electrostatic printing has heightened the interest in high resistance photoconductive materials. Among the photoconductive materials which have heretofore been used preferentially are elemental amorphous selenium, antimony trisulfide, zinc sulfide and zinc-cadmium sulfide. Each of these materials has been found to be of limited applicability although each of these materials has an extremely high resistivity in the dark, generally of the order of $10^{12}$ ohm centimeters, and a resistance decrease factor of about 100 or more when illuminated because some limitation in each material serves as a deterrent to its widespread use in photoconductive image-viewing tubes and in electrostatic photographic devices.

Ideally, a photoconductor employed in the above type applications should be a perfect insulator in the dark. In practice, materials with a resistivity of the order of at least $10^{12}$ ohm centimeters have been found suitable. Furthermore, an ideal material for such applications should become a good conductor on exposure to illumination. In actual practice, materials which have a resistivity of $10^{10}$ ohm centimeters, or less, when exposed to light are satisfactory. A third significant property of these materials is the speed with which the resistance drop is obtained on exposure to illumination. Photoconductive materials with a suitable combination of dark resistivity, light resistivity and speed of response include known semiconductive materials which are transparent in the form of relatively thick films and which comprise combinations of arsenic and sulfur. Such materials are disclosed in a copending patent application Serial No. 487,691, filed on February 11, 1955, by Herbert Schlosser.

I have now discovered a high resistance photoconductive material possessing a greatly increased sensitivity in addition to the advantageous combination of properties possessed by the aforesaid Schlosser photoconductor. The increased sensitivity of my novel photoconductive material is obtained by the addition of minor but nevertheless significant amounts of selenium to the arsenic-sulfur material corresponding roughly to the compound $As_2S_3$.

The novel photoconductive material constituting my invention may be prepared either by blending arsenic, sulfur and selenium in the desired proportions and then heating the mixture to an appropriate elevated temperature, or it may be prepared by adding selenium in elemental form to previously prepared finely divided arsenic sulfide or it may be found advantageous to compound my novel composition by mixing together in suitable proportions arsenic-sulfur and arsenic-selenium compounds of appropriate compositions. Whatever the method by which the composition is prepared, I prefer to employ the photoconductive material constituting this invention in the form of thin films deposited by vacuum deposition on any suitable substrate. The films may also be formed by sintering the components onto a substrate or by any other suitable method of coating.

To prepare my novel photoconductive material, I first prepared arsenic sulfide ($As_2S_3$) as follows. Metallic arsenic was purified by distillation and the so-purified arsenic was dissolved in nitric acid and the solution was then treated with excess hydrogen sulfide. The flocculent yellow-orange precipitate was separated by filtration, washed and dried and then heated to below its melting point in argon to remove excess sulfur.

The arsenic sulfide so obtained was mixed with small amounts of elemental selenium and was placed in a refractory boat and positioned in a bell jar provided with suitable connections to a vacuum pump and with means for heating the boat. After the system was pumped to a vacuum of about $0.02\mu$, the boat was heated to effect the deposition of the arsenic-sulfur-selenium composition on a clean glass plate positioned about 4 inches from the boat. Temperatures in the range of 250° C. to 450° C. were found to be suitable for deposition of films ranging from 1 and $50\mu$ in thickness. Compositions were prepared containing 1.5%, 2.5% and 10% selenium by weight and deposited in the form of thin films on a glass substrate which had previously been coated with a thin transparent layer of electrically conductive material. For comparison plates without any selenium were also prepared.

Plates so prepared were passed under a six thousand (6000) volt corona discharge unit and the voltage accepted by the plate was then measured. This value is reported below as $V_0$. One minute later the voltage on the surface of the plates was again measured. From this measurement the percentage of the charge retained at the end of one minute may be computed. This result is tabulated as "percent retained 1 min." and is indicative of the dark decay rate. Next the relative sensitivity of the plates is measured by exposing the plates to a sixteen foot candle incandescent white light source for one-tenth (0.1) second and measuring the voltage drop on the surface of the plates due to the illumination. The percentage voltage drop is representative of the relative percent sensitivity.

The table below shows for purposes of comparison the relative effect of the addition of selenium to compositions corresponding to the formula $As_2S_3$ processed in the manner above described.

| Material | As Evaporated | | | Heat Treated in $O_2$ 400° F., 1 Hr. | | |
|---|---|---|---|---|---|---|
| | $V_0$ | Percent Retained 1 Min. | Percent Sensitivity 1/10 Sec. | $V_0$ | Percent Retained 1 Min. | Percent Sensitivity 1/10 Sec. |
| $As_2S_3$ | 236 | 50 | 4.2 | 126 | 77 | 6.7 |
| $As_2S_3$+1.5% Se | 279 | 42 | 1.3 | 131 | 72 | 9.8 |
| $As_2S_3$+2.5% Se | 306 | 50 | 2.2 | 147 | 71 | 11.2 |
| $As_2S_3$+10% Se | 285 | 51 | 7.3 | 256 | 73 | 8.8 |

It will be noted that the deposited films as evaporated exhibited an increased ability to accept a charge as the selenium content was increased and that the sensitivity which fell off with small additions of selenium was recovered when approximately 5% by weight of selenium had been added. When the specimens were heated in oxygen, or in air for one hour at about 400° F., the percent charge retention was greatly improved but the ability to accept a charge was considerably decreased as compared with the specimens as evaporated. However, specimens containing between about 1.5% Se and 10% Se, after being subjected to an oxidizing atmosphere for one hour at a temperature between 300° F. and 400° F. all exhibited a greatly increased sensitivity with even the lower amounts of selenium as compared with the sensitivity of straight arsenic sulfide compositions.

The addition of amounts of selenium up to 10% by weight of the arsenic does not appear to impair the transparency of arsenic sulfide films, and where this is not required, it may be advantageous to add even greater amounts of selenium to obtain an increase in sensitivity over films of arsenic sulfide alone. Such additions have not been found to produce any undesirable history effect or to render either the dark resistance or light resistance of the resulting composition unsuitable for the intended applications.

I claim:

1. An evaporated transparent photoconductive material consisting essentially of $As_2S_3$ and between about 2.5% and 10% by weight of Se.

2. A photoconductive element composed of a support and a coating thereon of transparent photoconductive material in the form of a film of $As_2S_3$ containing between 2.5 and 10% by weight of Se, said film having been deposited on said support by evaporation of the constituents and the condensation of the constituents from the vapor state onto the support.

3. A photoconductive element of increased sensitivity as compared with $As_2S_3$, composed of a support and a coating thereon in the form of a film of $As_2S_3$ containing between about 2.5% Se and 10% Se by weight, said film having been deposited on said support by evaporation of the constituents and the condensation of the constituents from the vapor state onto said support which has thereafter been subjected to an oxidizing atmosphere for one hour at a temperature between about 300° F. and 400° F.

References Cited in the file of this patent

UNITED STATES PATENTS

| | | |
|---|---|---|
| 1,997,479 | Burg | Apr. 9, 1935 |
| 2,693,416 | Butterfield | Nov. 2, 1954 |

OTHER REFERENCES

Chemical Abstracts, v. 46, pages 2916g (1952).